(12) United States Patent
Vahida et al.

(10) Patent No.: US 8,854,922 B2
(45) Date of Patent: Oct. 7, 2014

(54) FOLDABLE MARINE SEISMIC SOURCE

(75) Inventors: Behzad Vahida, Saint Michel S/Orge (FR); Thierry Payen, Massy (FR)

(73) Assignee: Cggveritas Services SA, Massy (FR)

( * ) Notice: Subject to any disclaimer, the term of this patent is extended or adjusted under 35 U.S.C. 154(b) by 1242 days.

(21) Appl. No.: 12/313,112

(22) Filed: Nov. 17, 2008

(65) Prior Publication Data

US 2009/0147626 A1 Jun. 11, 2009

(30) Foreign Application Priority Data

Nov. 16, 2007 (FR) ...................................... 07 59112

(51) Int. Cl.
*G01V 1/38* (2006.01)
*G01V 1/00* (2006.01)

(52) U.S. Cl.
CPC ..................................... *G01V 1/006* (2013.01); *G01V 1/3817* (2013.01)
USPC ............... 367/144; 367/15; 367/16; 367/173; 367/153; 181/118; 181/120

(58) Field of Classification Search
USPC ......... 367/15–18, 23, 144, 153; 181/111, 118
See application file for complete search history.

(56) References Cited

U.S. PATENT DOCUMENTS

| | | | |
|---|---|---|---|
| 3,019,412 A | | 1/1962 | Crawford |
| 3,491,848 A | | 1/1970 | Giles |
| 4,506,352 A | * | 3/1985 | Brandsaeter et al. ........... 367/21 |
| 4,862,422 A | * | 8/1989 | Brac ............................... 367/19 |
| 4,960,183 A | * | 10/1990 | Young, II ...................... 181/107 |
| 5,164,922 A | * | 11/1992 | Cappelen et al. ............. 367/144 |
| 7,016,261 B2 | * | 3/2006 | Quinn et al. .................. 367/144 |
| 7,466,632 B1 | * | 12/2008 | Sorli ............................. 367/153 |
| 2003/0168277 A1 | * | 9/2003 | Hopperstad et al. .......... 181/111 |

FOREIGN PATENT DOCUMENTS

WO WO 01/71385 9/2001

* cited by examiner

*Primary Examiner* — Ian J Lobo
(74) *Attorney, Agent, or Firm* — Patent Portfolio Builders PLLC

(57) ABSTRACT

The invention relates to a source device for the emission of seismic waves designed to operate by being towed by a vessel. The source device according to the invention comprises at least three support-beams, a plurality of guns placed along each support-beam, a central hub receiving one end of support-beams and arranged such that support-beams can be deployed according to a star-like geometry, and the means to keep support-beams in this geometry during operation.

29 Claims, 7 Drawing Sheets

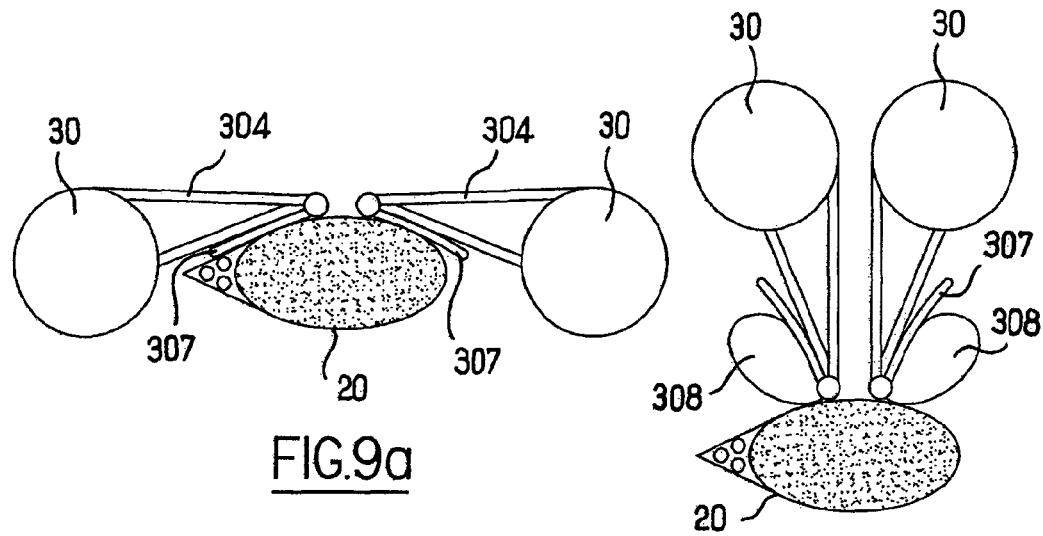
FIG.9a
FIG.9b
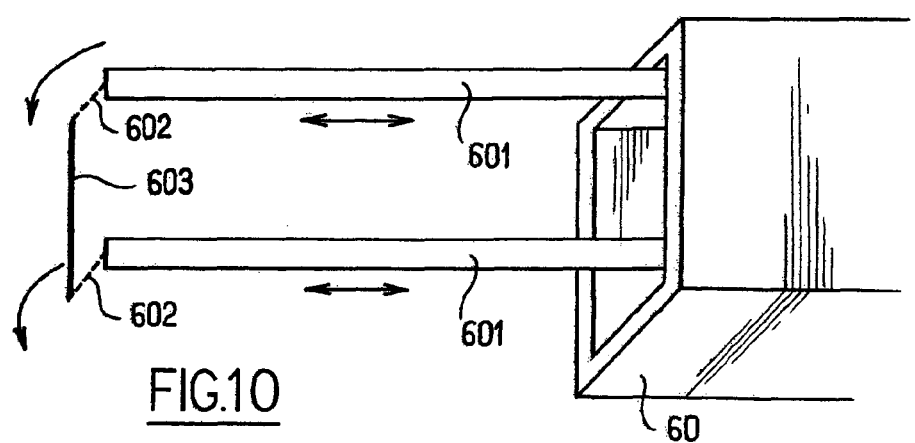
FIG.10
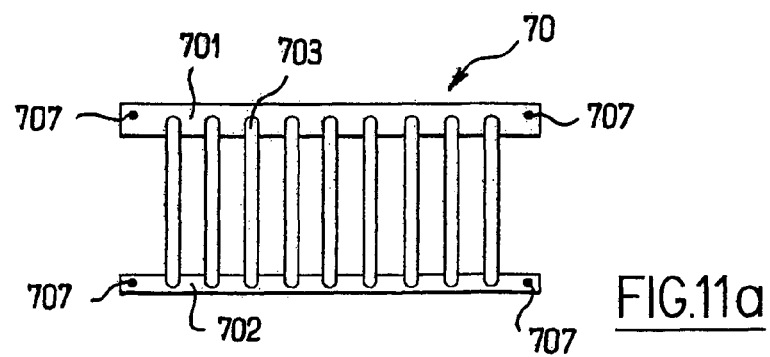
FIG.11a

FOLDABLE MARINE SEISMIC SOURCE

CROSS-REFERENCE TO RELATED APPLICATION

This application claims priority to French Application No. 0759112 filed Nov. 16, 2007 entitled "Foldable Marine Seismic Source".

The present invention relates to the field of acoustic energy sources used for marine seismic exploration.

The invention relates more specifically to an improved marine source of acoustic energy that can be implemented to generate energy in the form of acoustic waves in the water.

PRIOR ART

A technique used to search for oil or gas is to conduct seismic exploration of the subsurface. For imaging the structure of the subsurface, geophysicists use the so-called seismic reflection techniques.

In marine seismic acquisition, the most common technique is to tow behind a vessel:
One or more source(s) of energy for the emission of an acoustic wave, and
Seismic receivers arranged on streamers.

The source generates an acoustic wave into the water, creating a field of compression waves, which travels downward in a coherent way. When the field reaches interfaces between geological formations, called reflectors, there are reflections transmitted across the land and water to the seismic receivers to be converted into electrical signals and recorded.

The seismic receivers are arranged in such a way and in sufficient numbers to ensure that the recorded signals, called tracks, can be used to build an image of the configuration of geological layers.

As shown in FIGS. 1 and 2, a marine seismic source 1 includes a plurality of air guns 10 arranged along sub-arrays 11 of the rigid (beams) or soft (chains) type.

Each sub-array 11 has a linear geometry, and is connected to a float 12 through depth-cables 13. Air guns 10 are connected to sub-array 11 and maintained at a desired depth through chains 14.

The volume of each air gun 10 and the distance between air guns 10 along a sub-array 11 depend on the desired characteristics for the generated acoustic wave. Similarly, the number of sub-arrays 11 for a source 1 depends on the characteristics desired for the acoustic wave.

The configuration of the source is modular, and when a maintenance operation is necessary for example on an air gun 10, the sub-array 11 on which the air gun 10 is attached is brought back on board the vessel.

The use of such sub-arrays 11 has several limitations and drawbacks:
Regarding rigid sub-arrays, transverse positioning is not very accurate and is subject to instabilities caused by water currents and/or the wake generated by the vessel; in some conditions it is possible for sub-arrays to come into collision This can cause damage to the components of sub-arrays, and even interrupt operations.
Regarding flexible sub-arrays, positioning cables linked to streamer are used for positioning the sub-arrays; such an arrangement improves the accuracy of the positioning, but complicates recovery operations of the sub-array on board the vessel.
The relative motion between each float 12 and the respective sub-array 11 makes it difficult to establish compact rows of sub-arrays: indeed, swell can cause a swinging motion (from right to left relative to the vessel) of the sub-array relative to the float, which can lead to a collision of a sub-array with an adjacent sub-array, and so cause damage the air guns and/or the sub-arrays.

Developments in the field of marine sources are aimed at increasing the number of sub-arrays, their length, the depth of guns, or reducing the spacing between sub-arrays. Individually or in combination, these developments tend to amplify the disadvantages mentioned above.

A goal of the present invention is to obviate at least one of the disadvantages mentioned above.

PRESENTATION OF THE INVENTION

The source device in accordance with the invention is a marine seismic source for use in marine geophysical acquisition.

There is provided according to the invention a device for the generation of seismic waves designed to operate while being towed by a vessel, comprising at least three support-beams, a plurality of air guns placed along each support-beam, a central hub receiving one end of said support-beams and arranged such that support-beams can be deployed according to a star-like geometry, and means to keep said support-beams in this geometry during operation.

The star-shaped geometry provides a precise positioning of air guns relative to each other. It also prevents the guns of a support-beam from coming into contact with the guns of another support-beam under the action of swell or ocean currents. The proposed structure makes it possible to obtain such a geometry while meeting the operational requirements regarding deployment, geometric stability in operation and recovery on board the vessel.

It should be noted that the star-shaped geometry has been proposed previously (see U.S. Pat. No. 3,491,848, FIG. 5), with the aim of reducing the transmission of seismic waves between the source and receiver in a horizontal direction. Patent application WO 01/71385 advocates such a geometry with the aim of making the transmission pattern of the source azimuth-invariant. But none of those documents describes how to meet the operational requirements described above.

DETAILED DESCRIPTION

Other features and benefits of the invention will be apparent from the following description, which is purely illustrative and non-limiting and should be read in light of the attached drawings, in which:

FIGS. 9a and 9b are cross-sections of the connection of an air gun to a support-beam, according to an embodiment;

FIGS. 10, 11a to 11c, and 12a to 12c illustrate the lifting equipment of a vessel.

DESCRIPTION

We will now describe the marine seismic source device in reference to the figures.

General Description

Figure 3:
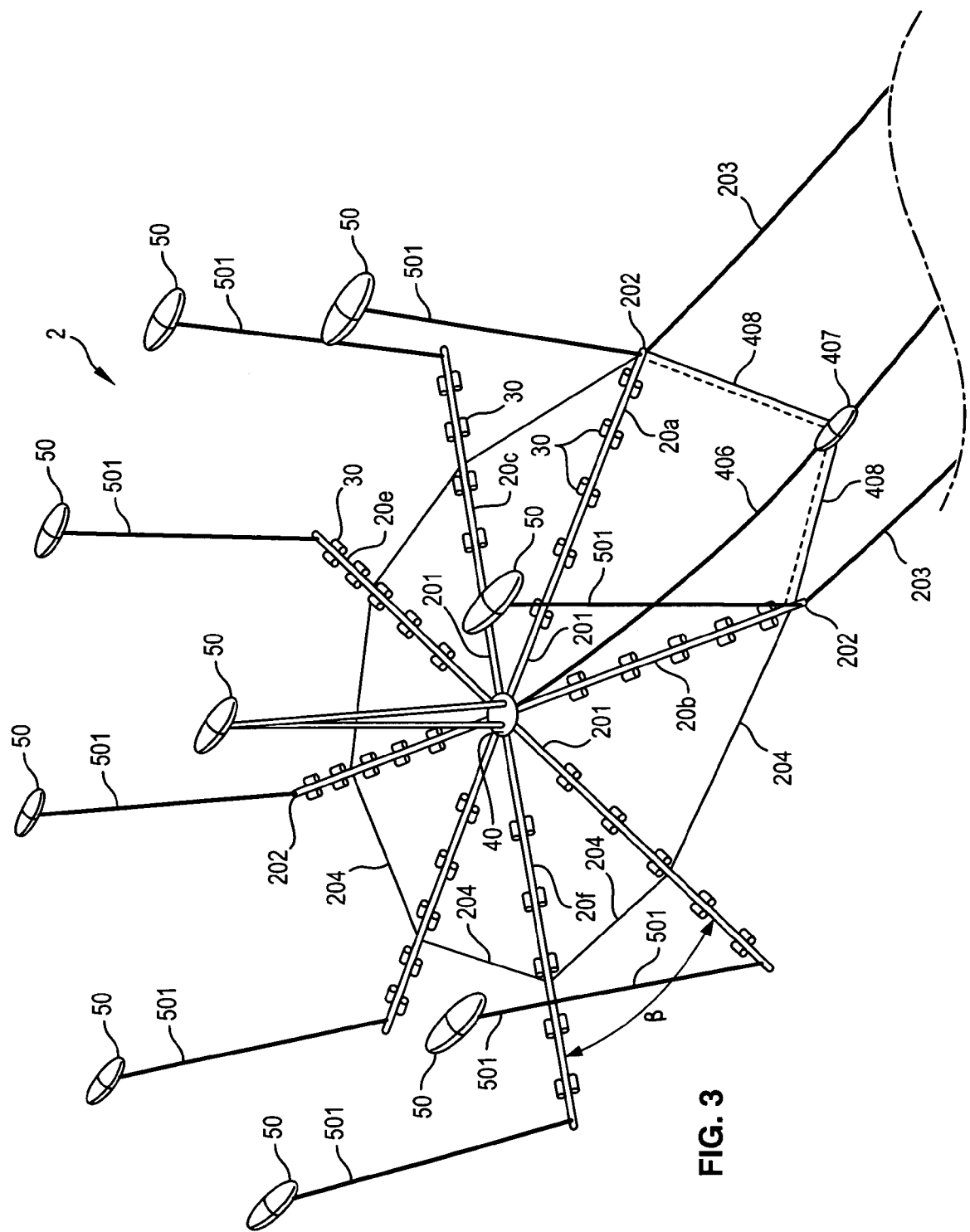
FIG. 3 is a schematic illustration of an embodiment of a device according to the invention in a deployed position.

As shown in FIG. 3, the marine seismic source device 2 for the transmission of seismic waves into the subsurface includes at least three rigid support-beams 20 each one supporting at least one gun 30.

In the embodiment shown in FIG. 3, the source device 2 includes eight straight support-beams 20 of 20 meters length, each support-beam supporting ten air guns 30 and the central annular frame supporting two guns.

The support-beams 20 are connected to each other at one of their ends 201 by a central connection hub 40 such as to form in the deployed position, as shown in FIG. 3, a star-like pattern.

A circumferential spacing system is associated with this star-like structure. This system consists of spacing cables (the term "cable" as used herein referring to mechanical connection) connecting adjacent support-beams to each other. Only the two support-beams in front of the source device are not connected by any spacing cable; they are respectively connected to the seismic vessel by towing cables instead.

The hydrodynamic drag generated by the system as it moves forward generates tension in towing cables or lines, which is in turn transmitted to the circumferential spacing cables through mechanical joints provided at the central hub. The tensioning of spacing cables provides geometrical stability to the system during operations. This stability is advantageous in particular in that it ensure precise relative positioning of the guns.

The geometry of the device prevents the guns 30 of a support-beam 20 from coming into contact with the guns of another support-beam or those of the central frame, particularly as a result of sea currents or swell. In addition, this allows the device to be immersed at greater depths than conventional devices.

The free end 202 of each support-beam 20 is attached to a float 50 through at least one depth cable 501. This allows the device to be maintained at the desired depth below the water surface, Similarly, the central hub 40 is connected to a float 50 through at least one depth cable 501. In the embodiment shown in FIG. 4, the central hub 40 is connected to a float through four depth cables 501.

The embodiment as shown features rotational symmetry. In other words:
Support-beams 20 are arranged around the central hub 40 so that angles β between two adjacent beams 20 are substantially the same,
the arrangement of guns 30 along support-beams 20 is the same for all beams. The guns can be arranged so as to be equidistant along the support-beam, or not, depending on the desired characteristics for the transmitted signal.

An arrangement with rotational symmetry results in the acoustic wave generated by the source device having an omnidirectional pattern (isotropic source). Other arrangements can also be considered depending on the desired characteristics for the transmitted signal.

In the embodiment shown in FIG. 3, the device has a eighth order rotational symmetry, the support-beams 20 of the source device lying in a plane. The fact that support-beams 20 extend in a plane is advantageous in respect of the stability of the source device geometry.

However, the support-beams 20 can be arranged so that they extend over a three-dimensional surface.

For example, in one embodiment, the support-beams 20 are arranged on a conical surface. This allows the transmission characteristics of acoustic waves to be modulated. In another embodiment, the support-beams 20 are curved and follow a spherical cap geometry.

One can also consider varying the distribution of guns from one beam to another, for example alternating arrangements so as to preserve rotational symmetry.

Central Connection Hub

The central connection hub 40 includes an annular frame 401 lying in a plane.

During operation, support-beams 20 extend radially from the annular frame.

The annular frame includes a plurality of mechanical joints 404. Each joint 404 is associated with a respective support-beam 20 and links that support-beam 20 to the annular frame 401.

Each mechanical joint 404 includes a first joint the axis of which is perpendicular to the plane containing the annular frame 401. This allows each support-beam 20 to pivot in the plane containing the annular frame about the first pivotal connection.

Figure 5:
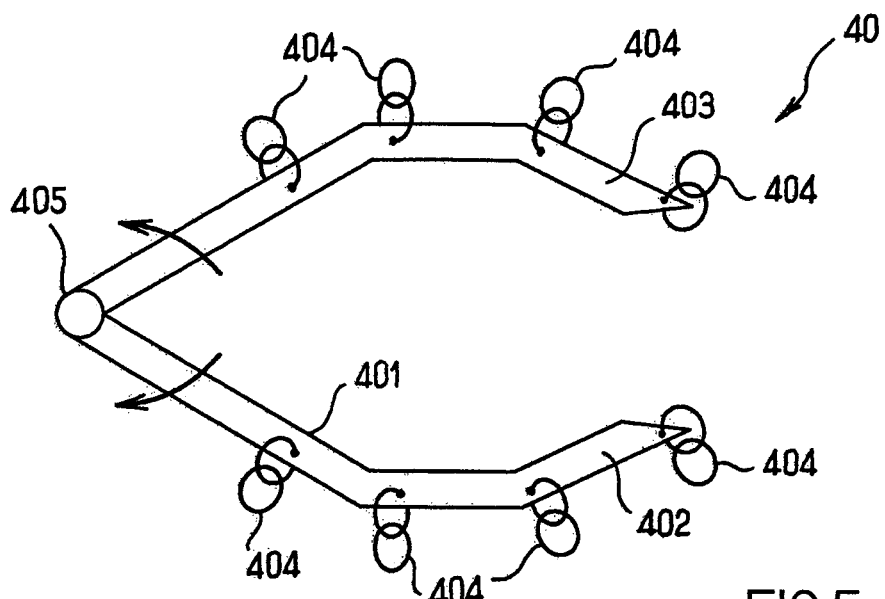
FIG. 5 is a top view of a central hub of the source device.

As shown in FIG. 5, the annular frame 401 consists of two parts 402, 403. One of the ends of each part 402, 403 is hinged around a pivotal connection 405 the axis of which is perpendicular to the plane in which the annular frame 401 extends. This allows both sides 402, 403 to rotate around the pivotal joint 405 so as to open the annular frame 401.

Figure 4:
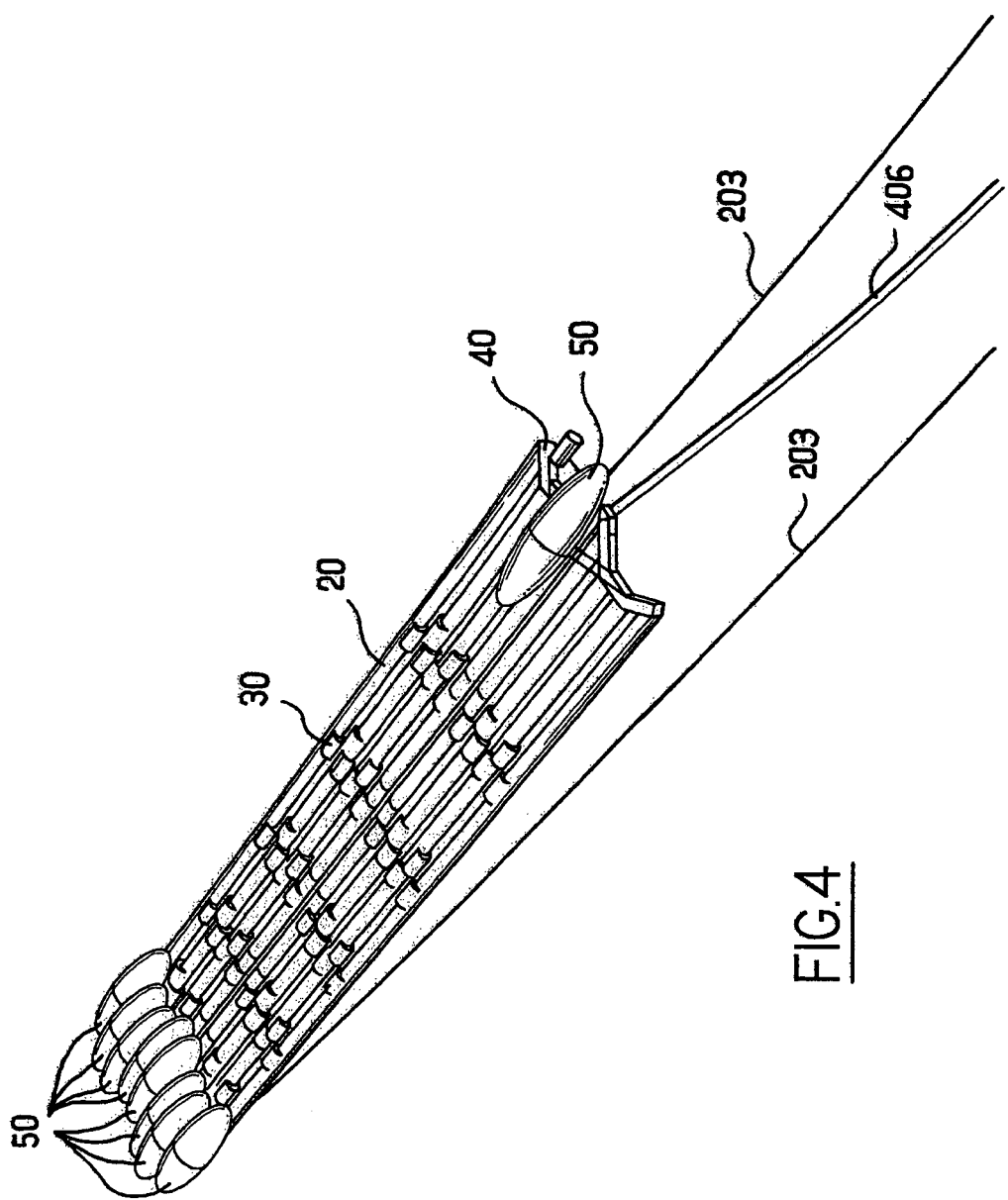
FIG. 4 is a schematic illustration of this embodiment in a folded position.

The fact that:
Each mechanical joint 404 includes a first pivotal connection whose axis is perpendicular to the plane in which the annular frame 401 extends, and that
Each part 402, 403 is articulated around a pivotal connection 405 whose axis is perpendicular to the plane in which the annular frame 401 extends
Allows folding of the device as shown in FIG. 4. Thus, for deployment operations, recovery on board the vessel, and storage, the device is folded so as to reduce its bulk size.

Because of the geometrical construction of the annular frame, it is possible to obtain a folded configuration in which the distance between all adjacent support-beams is the same, which makes it possible to increase the compactness of the device once folded.

Each mechanical joint 404 also includes a second pivotal connection with a rotation axis extending in the plane of the annular frame 401 and perpendicular to the longitudinal axis of the beam. This allows each support-beam to pivot out of the plane of the annular frame, reducing the mechanical stress (such as those due to swell) on the device.

This stems from the fact that the device is kept at a desired depth by floats respectively attached to the free ends of each support-beam 20 and the central connection hub 40 through depth cables. As a result, if a float 50 connected to a support-beam 20 is imparted a vertical movement caused by waves, the support-beam 20 associated with this float 50 will pivot around the second pivotal connection without affecting other parts of the source device.

The layout of the mechanical joints and their type can depart from the pattern described above. For example, the mechanical joint of the annular frame 401 may include a second pivotal connection in the plan for each part 402 and 403 so as to limit mechanical stress.

Spacing Cables and Towing Cables

As described above, the device may occupy two positions:
A deployed position when using the device for the generation of acoustic waves,
A folded position at the deployment, recovery on board the vessel and storage of the device.

Two adjacent support-beams 20a, 20b are connected to the vessel via towing ropes 203 at respectively their free ends 202 or another point thereof.

This allows the device to maintain its deployed geometry when it is towed by the vessel, i.e., when the towing cables 203 associated with two support-beams 20a, 20b are taut.

It is also possible to position the connection at a point other than the free end of the support-beams, in order to optimize the overall distribution of efforts in the device.

Other adjacent support-beams 20 not connected to the vessel are linked by pairs to the support-beams adjacent thereto by spacing cables 204. Only support-beams 20a, 20b connected to the vessel are not linked to each other with a bracing cable.

The spacing cables 204 prevent angles β between two adjacent support-beams 20 from exceeding a certain value, so as to maintain the star-like configuration of the device. Other means could be used to limit the spacing between two adjacent support-beams.

Figure 6A:
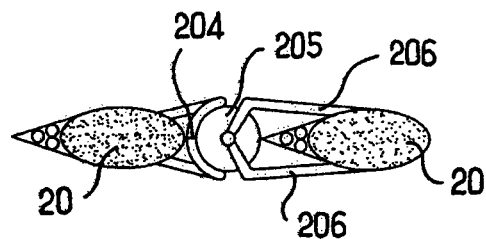
FIGS. 6a and 6b are schematic cross-sections of two adjacent support-beams linked by a cable paid out from an automatic winder.
Figure 6B:
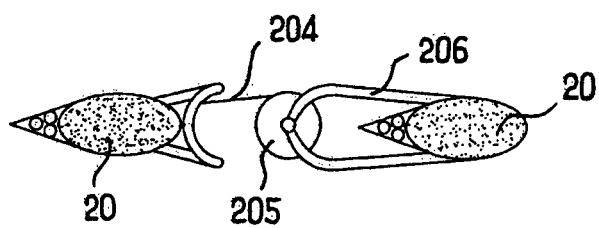

Each spacing cable 204 can be paid out from at least one automatic reel 205 attached to an adjacent support-beam 20 by means of securing means 206, as shown in FIGS. 6a and 6b. FIG. 6a shows an automatic reel 205 in which the spacing cable 204 is entirely wound up. FIG. 6b represents the same automatic reel in which the spacing cable 204 is partially paid out. The automatic reel 205 can be a spring reel.

This avoids the risk of the spacing cables 204 tangling when the device is folded.

In the embodiment shown in FIGS. 6a and 6b, each spacing cable 204 is paid out from a single automatic reel 205 attached to one of the two adjacent beams 20. In another embodiment, each spacing cable 204 is paid out from two automatic reels 205, each reel 205 being attached to an adjacent support-beam 20.

The central connection hub 40 is connected to the vessel through an umbilical 406. This makes the folding easy by pulling on the umbilical 406 while releasing the tension of towing cables 203. The umbilical 406 is used to convey compressed air to air guns 30 for the generation of sound waves.

A modified embodiment provides that tow cables are linked to a point 407 of the central umbilical located ahead of the device, using pulleys positioned at junction points 202 of towing cables 203 with support-beams 20a, 20b and cables 408 (in dotted line on FIG. 3) connecting point 407 of the umbilical to the pulleys. This allows the mass of the umbilical to be used in order to increase pretensioning in the circumferential spacing system. Since tow cables will partly support the mass of the umbilical, their tension will be increased. Other advantages of such a connection include: balancing vertical force components of tow ropes thus enhancing navigational stability; closing the loop of circumferential spacing thus enhancing shape stability and reducing the risk of tangling between towing cables and the central umbilical.

Support-Beams

Figure 7A:
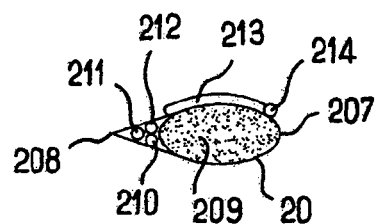
FIGS. 7a and 7b are schematic cross sections of a support-beam comprising a flap.
Figure 7B:
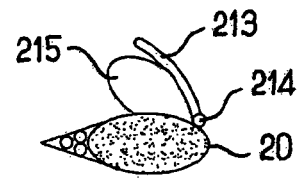

As shown in FIGS. 7a and 7b, each support-beam 20 includes a section with a hydrodynamic profile. This reduces the hydrodynamic resistance, or drag, of support-beams 20, and hence of the device. This also reduces hydrodynamic vibrations.

The profile of support-beams can be asymmetrical in order to generate a negative lift due to forward motion. This favors stability of the device in the vertical direction (depth).

Each support-beam 20 comprises a core 209 of expanded foam. This increases the buoyancy of support-beams 20, and limits the number and size of the floats 50. Alternatively, support-beams can be made of composite materials.

Each support-beam 20 includes a longitudinal recess 210 to receive electric cables 211 and a conduit 212 for compressed air. The longitudinal recess 210 is placed at the trailing edge 208 of each support-beam 20.

At least two support-beams 20c, 20d may include at least one flap 213 articulated to the beam 20c, 20d, the axis of mechanical joint 214 being parallel to the support-beam 20c, 20d. In this case, each flap 213 is capable of being moved:
from a closed position illustrated in FIG. 7a, where flap 213 extends in a plane substantially parallel to the plane in which the device extends,
to an open position illustrated in FIG. 7b, where the flap 213 extends in a plane intersecting the plane in which the source device extends.

These flaps 213 allow control of the navigation of the device in the transverse direction, especially for applications where two sources are positioned on either side of the median line of motion of the vessel (dual sources). These flaps can also be used to facilitate the folding and deployment of the device, or be used to increase depth stability of the device.

Each flap 213 is associated with flap moving means 213 to enable flap 213 to move from the closed position to the open position and vice versa.

In the embodiment illustrated in FIGS. 7a and 7b, flap moving means 213 includes a balloon 215 disposed between support-beam 20 and flap 213 to enable flap 213 to move:
from the closed position (FIG. 7a) to the open position (FIG. 7b) upon inflation of the balloon 215,
from the open position (FIG. 7b) to the closed position (FIG. 7a) upon deflation of the balloon 215.

Figure 8:
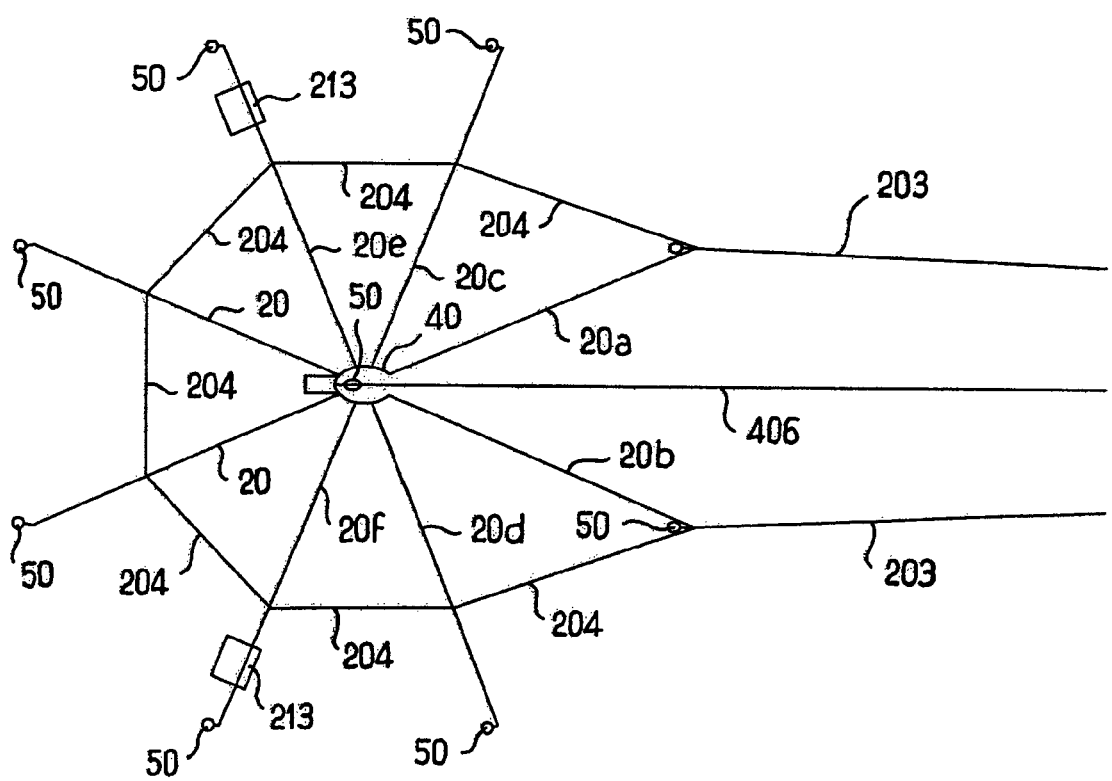
FIG. 8 is a top view of an embodiment of the source device in the deployed position.
Figure 11B:
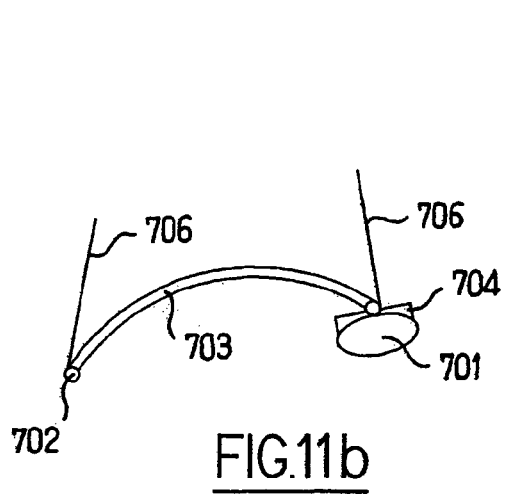
Figure 11C:
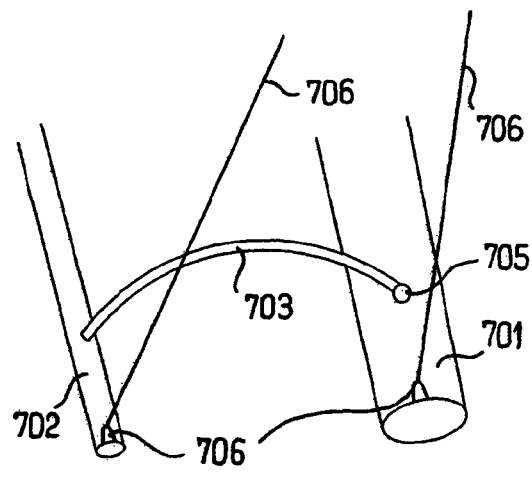

In the embodiment shown in FIG. 8, two support-beams 20e, 20f comprise each a flap 213 at their free end 202

When flap 213 associated with the first support-beam 20e is in the open position and the flap 213 associated with the second support-beam 20f is in the closed position, the device travels in a first direction (for example to the right in relation to the direction of motion of the vessel). When flap 213 associated with the first support-beam 20e is in the closed position and that the flap 213 associated with the second support-beam 20f is in the open position, the device travels in a second direction (for example to the left in relation to the direction of motion of the vessel).

It will be understood that, in accordance with this embodiment, each of the two support-beams 20 may include one or several flaps 213, and two or more support-beams 20 may include flaps 213.

For example, flaps 213 mounted on beams 20c and 20d will facilitate folding of the device when the flaps are in the open position, the towing cables 203 are slack and the tension of the umbilical 406 is maintained.

A flap 213 can also be associated with the central connection hub 40, for example at the pivotal joint 405 of the annular frame 401. This facilitates deployment of the device when the flap 213 associated with the central connection hub 40 is in the open position, the umbilical 406 is slack and the towing cables are taut.

The same type of flaps can also be used to generate an additional negative lift in order to increase the downward preponderance when higher depth stabilization is required.

Mounting Device for Guns

Each support-beam 20 is intended to support one or more guns 30, as well as the annular frame 401.

Figure 1:
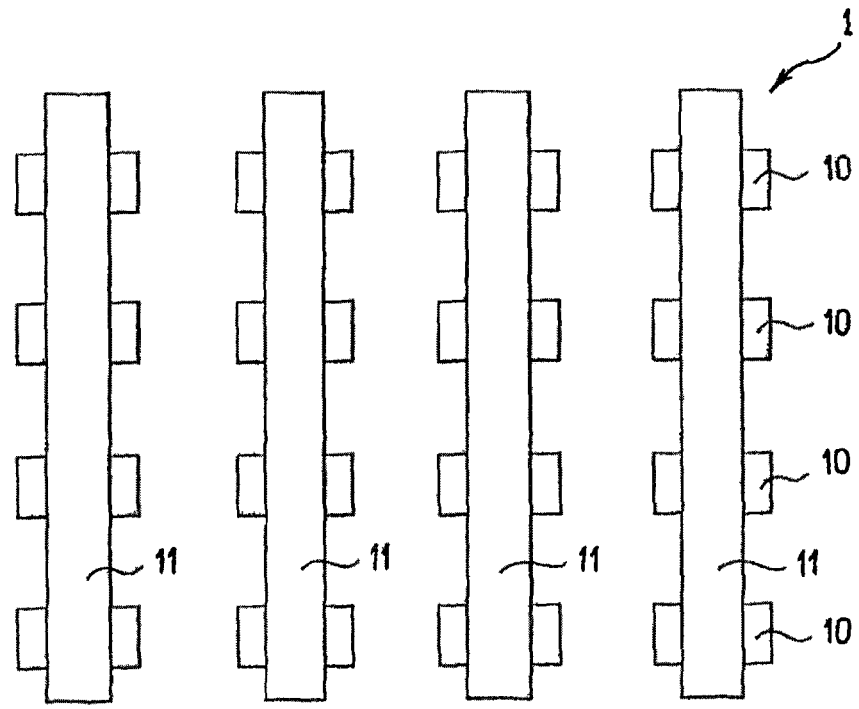
FIGS. 1 and 2 are schematic illustrations of a prior art device.
Figure 2:
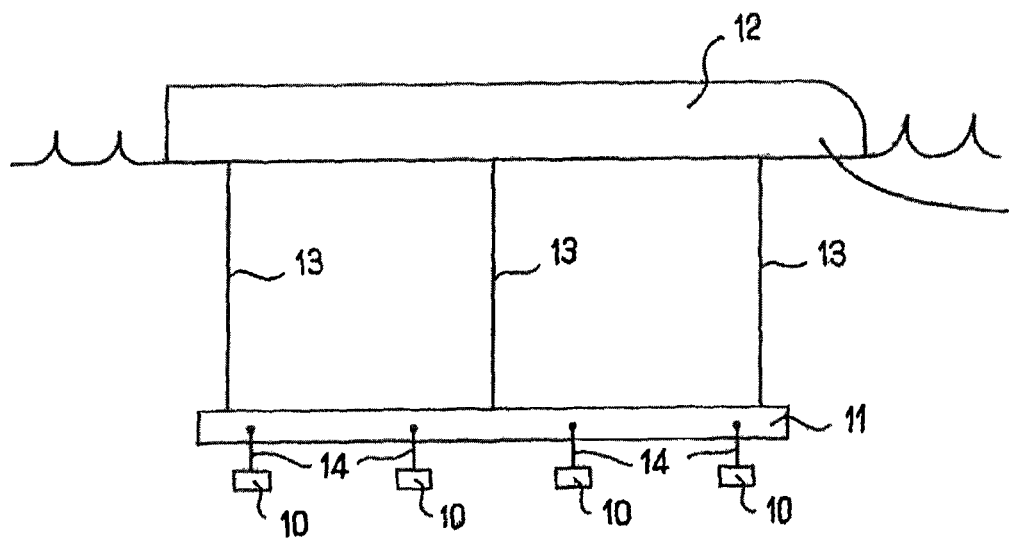

In the embodiment shown in FIG. 1, each support-beam 20 supports ten air guns 30 arranged in pairs at a given distance relative to the central connection hub 40. The annular frame 401 itself supports two guns.

Air guns 30 of each pair can be placed on both sides of the support-beam 20. This is intended to make for coalescence of the air bubbles generated by each air gun 30. So, when support-beams 20 extend in a plane, the guns 30 extend all in the same plane. Where the support-beams 20 extends over a three-dimensional surface, for example when support-beams 20 are inscribed on a conical surface, all the guns 30 extend over the generatrix of the cone.

Each air gun 30 Is suitably connected to its support-beam 20 through mounting device allowing the gun 30 to move from a first position called acquisition position, to a second position called storage position.

In the acquisition position, the guns of a pair 30 are placed on both sides of the support-beam 20, as shown in FIG. 9a. In other words, air guns 30 of a pair are placed in the plane containing the support-beams 20.

In the storage position of FIG. 9b, air guns 30 of a pair are placed above the associated support-beam 20. In other words, the guns 30 are placed above the plane containing the support-beams 20.

This avoids the guns 30 scraping on the vessel's deck when the source device is recovered on board. Furthermore, the fact that the guns 30 are located above the support-beam 20 in the storage position facilitates handling and maintenance interventions on air guns 30 when the device is on board the vessel.

The moving device for pivoting the arm 304 associated with a gun 30 can be of different kinds.

For example, in the embodiment illustrated on FIGS. 9a and 9b, the moving device associated with each gun 30 includes:

A rigid plate 307 fixed onto the arm 304, and
A balloon 308 disposed between the rigid plate 307 and support-beam 20.
Such moving devices enable the gun:
to move from the storage position to the acquisition position upon deflation of the balloon 308 (FIG. 9a)
to move from the acquisition position to the storage position upon inflation of the balloon 308 (FIG. 9b).

In addition, such moving devices are simple to operate and can use the air conveyed through the umbilical 406.

The guns attached to the central frame can be operated by means of mounting devices similar to those of the support-beams. However, the guns of the annular frame are not necessarily mounted in symmetrical pairs.

Floats

The floats 50 associated with support-beams 20 and the central connection hub 40 can have hydrodynamic shapes and be disposed horizontally or vertically.

Each depth cable 501 can suitably be paid out from either a winch mounted on the float 50, or a winch mounted at the free end of its support-beam 20.

This helps prevent the depth cables 501 tangle during storage of the device in the vessel and facilitates handling operations.

These winches can have electrical supply or be autonomous (battery-operated), wire controlled or remotely controlled.

Other types of lifting and lowering means can also be contemplated.

Figure 12A:
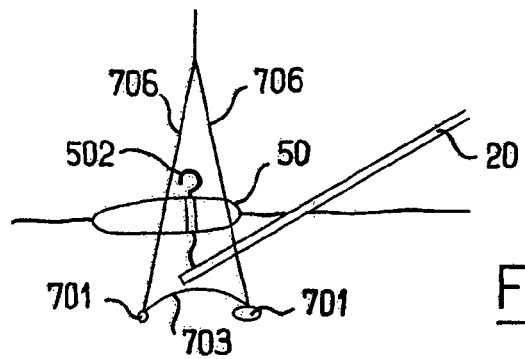

Finally, as shown in FIG. 12a, each float 50 may include a hook 502 for the recovery from water or lowering into the water of the device. This facilitates handling of the device.

Umbilical and Associated Circuits

The umbilical is designed to include means for conveying air under pressure, electrical power and data between the vessel and the source device. The use of fiber optics can be envisaged with regard to the transmission of data.

The umbilical also transmits tension forces especially during folding phases and sailing phases between the vessel and the shot point. In order to lower the tension of the umbilical during the unfolding and operation phases, it is possible to partially support its mass by towing cables as explained above. Alternatively, an additional flotation can be provided through the use of intermediate buoys or cores made of expanded foam, for example. Similarly, the tension core of the umbilical can be made of lightweight material in order to reduce its own weight.

Once they have reached the central frame, the various conveying means extend along the support-beams until the guns and other components of the device. The star-like geometry is optimal with regard to the total length of these conveying means.

Suitably, conveying means as they extend along the support-beams may be included in the rigid or flexible fairing placed on the trailing edge of the beam. This helps reducing the drag of the device while providing quick access to these conveying means during maintenance interventions.

Vessel's Equipment

The vessel may include various equipment for the handling of the device described above. It will be appreciated that this type of equipment can also be used with other devices, such as those of the prior art including a plurality of parallel sub-arrays. Examples of equipments for handling the device are illustrated in FIGS. 10 and 11a-11c.

These equipment include retractable lifting arms 601. One of the ends of each lifting arm is attached to a hoisting chain 602 connected to a lifting beam 603.

Retractable lifting arms 601 are adapted for deployment at the stern of the vessel 60. The lifting beam 603 is adapted to accommodate the hooks 502 of floats 50 when the device is subject to handling operation.

The vessel can also include a hoisting grid 70 comprising an elliptical front beam 701, a cylindrical rear beam 702 and teeth 703.

The front beam 701 and rear beam 702 are parallel, the teeth (curved rods) 703 extending perpendicular to the front beam 701 and rear beam 702 alongside the same so as to form a grid.

The front beam 701 is adapted to engage support-beams 20 while handling the device. It may have, on its face adapted to engage support-beams 20, a flexible material 704 to cushion the contact between the front beam 701 and support-beams 20.

Teeth 703 are shaped as curved rods and are spaced such a distance as to allow a support-beam 20 to pass between two adjacent teeth 703.

Each tooth 703 is secured to the front beam 701 by a simple joint 705 the rotation axis of which is parallel to the beam 701; this allows the front beam 701 to pivot, so as to maintain a plane contact between the front beam 701 and support-beams 20 as will be explained later.

The hoisting grid 70 is suspended from a crane vessel through lifting chains 706 attached to the ends of the front beam 701 and rear beam 702 of grid 70 at lifting points 707.

Operating Principle

The principle of operation of the device described above is as follows.

When the device is deployed, i.e., when support-beams 20 are arranged in a star-like geometry, the device is used to generate acoustic waves for the acquisition of seismic data indicative of the geology of the subsurface.

The device is towed by the vessel. Acoustic waves are generated and transmitted by the guns 30.

If the device has a rotational symmetry, the transmission of acoustic waves is omnidirectional.

Where the support-beams 20 of the device have a hydrodynamic profile, the drag of the device is reduced. In addition, the position of 30 on both sides also helps reducing the hydrodynamic drag of the device as compared with a system where the guns would be located above or below the support-beams. This in-plane arrangement also optimizes the mechanical stresses applied onto the associated support-beam.

The generated acoustic waves are reflected by the different layers of the subsurface and are recorded by hydrophones located on streamers towed by the vessel.

Once data acquisition is completed, or in the event of a malfunction of the device, the latter is folded to allow the recovery on board the vessel.

In the event that floats 50 includes winches, depth cables 501 are wound up in winches for raising the support-beams 20 near the surface of the water.

In the case of articulated guns 30, air guns 30 are lifted above the support-beams 20 using the moving device of air guns 30.

Optionally, this step can be performed before raising support-beams 20 near the surface of the water.

Then the tension in the umbilical 406 is increased and that exerted on towing cables is decreased. This induces the pivoting of the two parts 402, 403 of the annular frame 401 around central mechanical joint 405, and of support-beams 20 around an axis of rotation perpendicular to the plane in which the support-beams 20 lie.

These elements pivot until the device is folded, i.e. until support-beams 20 are positioned behind the central connection hub 40 relative to the vessel, and until these beams 20 are arranged substantially parallel and at equal distance from each other, as shown in FIG. 4.

In case flaps 213 are provided on support-beams 20, they are lifted to facilitate folding of the source device. Furthermore, in cases where the central connection hub 40 also includes a flap, it is folded as as to facilitate folding of the device.

The tension on the umbilical 406 is then increased until the device is brought close to the stern of the vessel.

The lifting arms 601 are deployed and the lifting beam is lowered to the level of the hook 502 of the float 50 linked to the central connection hub 40. The hook 502 of the float 50 is inserted in he lifting beam 603.

Once the hook 502 is inserted, the lifting beam is lifted. The lifting beam 603 is then brought back inside the vessel 60 by retracting the lifting arms 601.

Once the central connection hub 40 located at the stern of the vessel 60, the hook 502 of the float 50 is disengaged from the lifting beam 603 and attached to the securing means of vessel 60.

The lifting arms are then redeployed to move the hoisting grid 70 such as to place it beneath the free ends of support-beams 20, as shown in FIG. 12a.

The hoisting grid 70 is raised such as:

To interweave support-beams between the teeth 703 of the hoisting grid 70,

To cause the front beam 701 to engage support-beams 20 near their free ends.

Figure 12B:
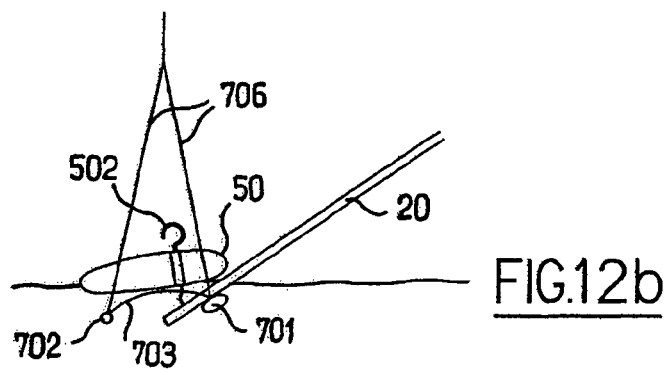
Figure 12C:
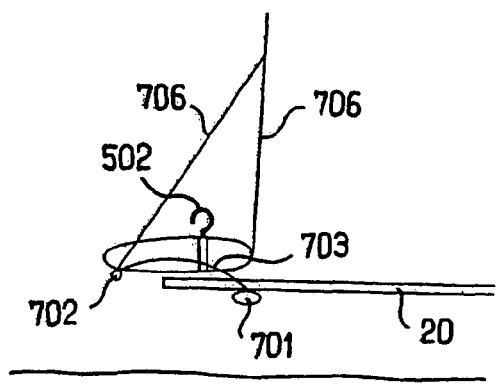

The support-beams 20 come into contact with the front beam 701 of the hoisting grid 70 and are raised out of water (see FIG. 12b).

The rear beam 702 comes into contact with the floats for raising them out of water. The grid is raised until the support-beams extend in a substantially horizontal direction.

The lifting grid and support-beams 20 of the device are brought back inside the vessel.

The support-beams 20 may scrape on the vessel's deck during the recovery of the device on board. Owing to the mounting devices for guns 30, as guns are moved from an acquisition position (where the guns 30 are on both sides of support-beams 20) to a storage position (where the guns 30 are located above the support-beams 20), the guns 30 do not scrape the vessel's deck while handling the source device.

The vessel's travelling cranes can be used to manipulate the device inside the vessel.

The deployment of the device includes the same steps in reverse order.

It will be appreciated that many changes can be made to the embodiment as described above within the scope of the invention.

For example, the central connection hub 40 and/or support-beams 20 can be linked to more than one float 50.

Moreover, in the previously described embodiments, the central connection hub adapted to receive support-beams is articulated to the support-beams. It can be contemplated to link the central hub to support-beams by removable means, for example, by interengaging parts or by any other technique known to the skilled person, this removable attachment being articulated or not.

Finally, the star-like configuration of the device, the position of the central connection hub and/or the length of the support-beams can be varied.

The invention claimed is:

1. A device for the generation of seismic waves designed to operate while being towed by a vessel, comprising at least three support-beams, a plurality of air guns placed along each support-beam, a central connection hub receiving one end of said support-beams and arranged such that support-beams can be deployed according to a star-like geometry, and means to keep said support-beams in this geometry during operation.

2. A device according to claim 1, in which one end of each support-beam is linked to the central hub so that said support-beams are adapted to be displaced from a first folded position where support-beams extend generally parallel to each other to a second deployed position where support-beams are arranged in a star-like pattern.

3. A device according to claim 1, in which the guns respectively placed on of the support-beams are arranged so as to meet the characteristics sought for the signal, and the angle ($\beta$) between two adjacent support-beams is constant during operation.

4. A device according to claim 1, in which said support-beams lie in a plane.

5. A device according to claim 1, in which said support-beams are inscribed on a conical surface.

6. A device according to claim 1, in which the central hub includes an annular frame lying in a plane, said annular frame comprising at least three mechanical joints that link support-beams to the annular frame.

7. A device according to claim 6, in which the annular frame consists of two parts of which one end is hinged around a pivotal joint whose axis is perpendicular to the plane in which the annular frame extends.

8. A device according to claim 6, in which each mechanical joint has a pivotal connection whose axis is perpendicular to the longitudinal axis of support-beam and extends in the plane of the annular frame.

9. A device according to claim 6, in which each mechanical joint includes a pivotal connection whose rotation axis is perpendicular to the longitudinal axis of the support-beam and perpendicular to the plane containing the annular frame.

10. A device according to claim 1, in which the free end of each support-beam is attached to a float through at least one depth cable and the central connection hub is attached to a float through at least one depth cable.

11. A device according to claim 1, in which, in operation, two adjacent support-beams are connected to the vessel by means of towing cables.

12. A device according to claim 11, in which support-beams not connected to the vessel are connected to each other through spacing cables.

13. A device according to claim 12, in which each spacing cable is paid out from at least one automatic reel mounted on an adjacent support-beam.

14. A device according to claim 1, in which for each support-beam, guns are arranged in pairs at a distance relative to the central connection hub, the guns of each pair being placed on opposite sides of the support-beam.

15. A device according to claim 1, in which each air gun is connected to its support-beam through a mounting device adapted for allow the air gun to move from a first acquisition position to a second storage position.

16. A device according to claim 15, in which, in the acquisition position, the guns are placed in the plane containing the support-beams.

17. A device according to claim 15, in which, in the storage position, the guns are placed above the plane containing the support-beams.

18. A device according to claim 15, in which the mounting device includes an arm having a mechanical joint at the end connected to the support-beam, the axis of the mechanical joint being parallel to the support-beam, and a moving device for causing the arm to pivot.

19. A device according to claim 18, in which the moving device for the air gun includes a rigid plate attached to the arm and a balloon located between the rigid plate and the support-beam adapted to be inflated to move the air gun from the acquisition position to the storage position.

20. A device according to claim 1, in which each support-beam has a core of expanded foam.

21. A device according to claim 1, in which each support-beam has a hydrodynamic-profile cross-section.

22. A device according to claim 1, in which each support-beam includes a longitudinal recess adapted to receive electric cables and a conduit for compressed air.

23. A device according to claim 1, in which at least two support-beams respectively include at least one flap hinged to the beam, the axis of the mechanical connection being parallel to the beam, the flap being adapted to be moved from a closed position to an open position.

24. A device according to claim 23, in which each support-beam including an articulated flap also includes a balloon between the support-beam and the flap for moving the flap from the closed position to the open position when the balloon is inflated, and from the open position to the closed position when the balloon is deflated.

25. A device according to claim 10, in which each depth cable is paid out from at least a winch, controlled or remotely controlled, electrically powered or autonomous, mounted on the float.

26. A device according to claim 10, in which the floats are of hydrodynamic shape, and are placed horizontally or vertically.

27. A device according to claim 10, in which each float includes a hook for the extraction from water or lowering in water of the device.

28. A system for generating seismic waves towed by a vessel, comprising at least three support-beams, a plurality of guns placed along each support-beam, a central connection hub receiving one end of support-beams so that support-beams are deployed according to a star-like geometry, a pair of adjacent support-beams being connected to towing cables connected to the vessel, the other pairs of adjacent beams being linked together by spacing cables.

29. A device according to claim 2, in which the guns respectively placed on of the support-beams are arranged so as to meet the characteristics sought for the signal, and the angle ($\beta$) between two adjacent support-beams is constant during operation.

* * * * *